(12) United States Patent
Hormadaly

(10) Patent No.: US 7,435,695 B2
(45) Date of Patent: Oct. 14, 2008

(54) LEAD-FREE PHOSPHATE GLASSES

(75) Inventor: Jacob Hormadaly, Omer (IL)

(73) Assignee: B.G. Negev Technologies and Applications Ltd., Beer Sera (IL)

( * ) Notice: Subject to any disclaimer, the term of this patent is extended or adjusted under 35 U.S.C. 154(b) by 576 days.

(21) Appl. No.: 11/007,594

(22) Filed: Dec. 9, 2004

(65) Prior Publication Data

US 2006/0128549 A1 Jun. 15, 2006

(51) Int. Cl.
- *C03C 3/16* (2006.01)
- *C03C 3/21* (2006.01)
- *C03C 3/19* (2006.01)
- *C03C 3/17* (2006.01)
- *C03C 8/16* (2006.01)

(52) U.S. Cl. .............. 501/45; 501/46; 501/47; 501/48; 501/20

(58) Field of Classification Search ............ 501/19, 501/24, 26, 43, 44, 45, 46, 47, 48
See application file for complete search history.

(56) References Cited

U.S. PATENT DOCUMENTS

| | | | |
|---|---|---|---|
| 3,979,322 A * | 9/1976 | Alexeev et al. ........ 252/301.6 P |
| 4,261,751 A * | 4/1981 | Nakamura et al. ............ 501/42 |
| 4,940,677 A | 7/1990 | Beall et al. |
| 4,996,172 A | 2/1991 | Beall et al. |
| 5,022,921 A * | 6/1991 | Aitken ........................ 106/38.9 |
| 5,071,795 A | 12/1991 | Beall et al. |
| 5,122,484 A | 6/1992 | Beall et al. |
| 5,173,456 A * | 12/1992 | Hayden et al. ................ 501/45 |
| 5,246,890 A * | 9/1993 | Aitken et al. ................... 501/15 |
| 5,286,683 A | 2/1994 | Aitken |
| 5,328,874 A | 7/1994 | Beall et al. |
| 5,529,961 A * | 6/1996 | Aitken et al. .................. 501/45 |
| 6,309,989 B1 * | 10/2001 | Kikutani ...................... 501/15 |
| 6,617,269 B2 * | 9/2003 | Yamanaka .................... 501/24 |
| 7,141,524 B2 * | 11/2006 | Wolff et al. ................... 501/45 |
| 2004/0092378 A1 * | 5/2004 | Wolff et al. .................... 501/45 |
| 2005/0003948 A1 * | 1/2005 | Yamazaki ..................... 501/45 |
| 2005/0054511 A1 * | 3/2005 | Fujiwara et al. .............. 501/45 |

FOREIGN PATENT DOCUMENTS

| | | |
|---|---|---|
| JP | 09-188544 | 7/1997 |
| JP | 2000-072473 | 3/2000 |

OTHER PUBLICATIONS

Y. He et al., "Development of a low temperature phosphate sealing glass", *Glass Technology*, vol. 33, No. 6, pp. 214-219, 1992.
V. Akishin et al., "Low-Melting Lead-Free Phosphate Glasses For Electronics", *Latvijas Kimijas Zumals*, vol. 2, pp. 101-106, 1997.
N. H. Ray et al., "Oxide glasses of very low softening point. Part 2. Preparation and properties of some zinc phosphate glasses", *Glass Technology*, vol. 14, No. 2, pp. 55-59, Apr. 1973.

* cited by examiner

*Primary Examiner*—Jerry Lorengo
*Assistant Examiner*—Elizabeth A Bolden
(74) *Attorney, Agent, or Firm*—Browdy and Neimark P.L.L.C.

(57) ABSTRACT

Disclosed are zinc niobium phosphate glasses consisting essentially, expressed in terms of mole percent on the oxide basis of, 40-65% $P_2O_5$, 25-37% ZnO, 0.1-15% $Nb_2O_5$, 0-6% $Al_2O_3$, 0-5% $Bi_2O_3$, 0-3% $Na_2O$ and 0-5% $B_2O_3$, said glass exhibiting glass transition temperature below 450° C., a dilatometer softening point below 500° C., coefficient of expansion in the range of $80$-$120 \times 10^{-7}$ °$C.^{-1}$, good chemical durability and blue color. The glass of the present invention is useful for sealing optical fiber to ferrule by local heating.

23 Claims, No Drawings

LEAD-FREE PHOSPHATE GLASSES

FIELD OF THE INVENTION

This invention relates to low glass transition temperature zinc phosphate glasses. More particularly, the present invention relates to lead-free zinc phosphate glass composition with low glass transition temperature.

BACKGROUND OF THE INVENTION

Glass in the form of powder (obtained by grinding glass frits) have been used for many years as sealants and as coating on glasses, ceramics, metals and in thick film microelectronics. To function as a low temperature sealant and as an overglaze in thick film microelectronics, the glass has to soften and flow at temperatures lower than 500° C. Most of the commercial compositions are based on lead borate (PbO—$B_2O_3$) system or its modifications with zinc (PbO—$B_2O_3$—ZnO). These glasses contain high levels of PbO (typically 70-80 wt %) and have low durability. Lead is toxic and the trend today is to limit its use and eventually eliminate it from compositions used in sealing and microelectronics. Most of the devices made with high lead containing glasses find their way to dump sites where the lead is leached into the water table, the leaching is facilitated because of the low durability of high lead containing glasses.

One object of the present invention was to devise lead-free glass compositions having a glass transition temperature (Tg) no higher than 450° C. and, in a form of powders, would demonstrate flow properties similar to those displayed by the above mentioned lead glasses.

Another object of the present invention is to provide glass compositions with sufficient durabilities, expansion coefficients and flow properties for sealing optical fibers to ceramic ferrules and Kovar™.

Yet another object of the present invention is to provide glass compositions, essentially lead-free, and having absorption bands in the visible and/or in the near infra red region of the spectrum to allow local heating (and hence sealing) by laser radiation.

SUMMARY OF THE INVENTION

It has now been found by the inventor that by appropriately choosing the ingredients of the glass composition and controlling their concentrations within well-specified ranges, it is possible to obtain a low softening point zinc phosphate glass which is free of lead, and yet possesses valuable physical and chemical properties which render the glass useful for various purposes, in particular, as a sealant of optical fiber to a ferrule made of ceramics or Kovar.

Thus, according to one aspect of the invention, there is provided a glass composition consisting, in terms of mole percent of the total composition, 40.1-75% glass forming compounds and the balance glass modifiers. The 40.1-75% glass forming compounds consists of 40-65% P2O5; 0.1-15% Nb2O5 and the glass modifiers consists of 25-37% of ZnO; 0-6% Al2O3; 0-10% Bi2O3, 0-5% B2O3; Ta2O5, V2O5, Sb2O3, ZrO2, and/or TiO2 in total amount of 0-5%; 0-3% alkali oxides; 0-5% alkali fluorides; oxides of Mg, Ca, Sr, Ba, Cu, Fe, and Mn, in a total amount of 0-5%.

Hereinafter, by the term "glass-forming compounds" is meant the class of compounds each of which is capable of forming a glass by itself upon melting and cooling, as well as the class of compounds which are usually known in the art as "conditional glass-forming compounds". Conditional glass-forming compounds do not form a glass by themselves upon melting and cooling, however, they form a glass when mixed with another appropriate compound. $SiO_2$, $P_2O_5$ and $B_2O_3$ are compounds belonging to the first class, whereas $Bi_2O_3$, $Al_2O_3$ and $Nb_2O_5$ are members of the second class.

Suitable glass forming compounds as defined above, in addition to $P_2O_5$, $B_2O_3$, $Bi_2O_3$, $Al_2O_3$ and $Nb_2O_5$, may be selected, for example, from among the group consisting of $Ta_2O_5$, $V_2O_5$, $Sb_2O_3$, $ZrO_2$ and $TiO_2$ or mixtures thereof. Among these compounds, most preferred are $Ta_2O_5$ and $V_2O_5$, in the amount of at most 5 mole %, $TiO_2$ and/or $ZrO_2$, the sum of the amounts of said $TiO_2$ and/or $ZrO_2$ being at most 3 mole % of the total composition. The total amount of all glass forming compounds, i.e., $P_2O_5$, $Nb_2O_5$, $Al_2O_3$ and $Bi_2O_3$ and the optional additional glass forming compounds, selected from the group consisting of $B_2O_3$, $Ta_2O_5$, $V_2O_5$, $Sb_2O_3$, $ZrO_2$ and $TiO_2$ or mixtures thereof, is 40.1-75 mole %.

The term "glass modifiers" is herein used to define a class of oxides and halogen compounds which do not possess the ability to form a glass by themselves upon melting and cooling, nor when contacted with additional compounds, other than compounds belonging to the class of glass forming compounds described above. However, the glass modifiers are capable of modifying the chemical and physical properties of the glasses containing them. ZnO and $Na_2O$ are known in the art as glass modifiers. Suitable glass modifiers which are optionally included in the glass compositions according to the present invention, in addition to ZnO and $Na_2O$ may be selected for example from the group consisting of MgO, CaO, SrO, BaO, oxides and/or fluorides of alkali metals and oxides of transition metals such as CuO, MnO, and $Fe_2O_3$. The total amount of all glass modifiers present in the composition, i.e., ZnO, alkali oxides, alkali fluorides, MgO, CaO, SrO, BaO, and oxides of transition metals such as CuO, MnO and $Fe_2O_3$, is 25-59.9 mole % of the total composition.

The above definitions of the terms "glass-forming" compounds" and "glass modifiers" are based on the general properties of the compounds as they are known and accepted in the art, without being bound to any explanation relative to the exact role of each of these compounds in the compositions according to the present invention.

According to another aspect of the present invention, there is provided a glass composition that is free of lead and cadmium, has a $T_g$ of between 200° C. and 500° C., and expansion coefficient of $12 \times 10^{-6} K^{-1}$ or less, said glass comprising, by mol percent of the total composition, at least 3% $Nb_2O_5$ and/or Al2O3, 25-40% ZnO, and at least 40% $P_2O_5$.

Another aspect of the present invention relates to thick film formulations comprising finely divided particles of the glass of the present invention dispersed in an organic medium, optionally together with other solids, such as, for example, conductive metal particles, metallic oxide or ceramic fillers, to various applications of said formulations and to an article comprising said formulation fired on a ceramic substrate.

RELATED ART

Modifications of zinc phosphate glasses were the theme of many previous US patents and publications in journals. N. H. Ray et al. "Oxide glasses of very low softening point 2. Preparation and properties of some zinc phosphate glasses", Glass Technology (1973), 14 (2) 55-9, describe zinc phosphate glasses containing alkali and alkaline earth metal oxides with glass transition temperature (Tg) as low as 150° C. This paper also presents the water resistance of these glasses, viscosities and the effects of $Li_2O$ and MgO on the properties. Beall et al. in U.S. Pat. Nos. 4,940,677; 5,071,795;

4,996,172; 5,122,484 and 5,328,874 teaches zinc phosphate low glass transition temperature glasses and reviews the prior art relating to glasses exhibiting transition temperatures (Tg) below 450° C. coupled with good resistance to attack by water. Glasses taught by Beall are multicomponent glasses which are lead-free (U.S. Pat. Nos. 5,122,484; 5,328,874 and 5,071,795) or incorporate lead (U.S. Pat. Nos. 4,996,172 and 4,940,677).

Y. He and D. E. Day in "Glass technology Vol. 33 No. 6 pp 214-219 (1992)," reported the development of low temperature phosphate glasses. Their study shows that phosphate glasses with very good durability (in boiling water) can be synthesized with proper choice of the oxides.

V. Akishin et al. "Low melting phosphate glasses to thick film resistors", Phosphorus Research Bulletin (2002), 13, 73-76, teaches low melting zinc metaphosphate glasses ($ZnO:P_2O_5=1:1$, $SiO_2$ 8-12, $Al_2O_3$ 2-8 mole %) for thick film resistors.

M. Onosawa in Japanese patent No. JP 2000072473 issued Mar. 7, 2000 (Application No. JP 1998-248545) teaches low melting point bismuth zinc phosphate glass and sealing compositions. The glass contains (wt % oxides) 45-70 $P_2O_5$, 5-30 ZnO, 5-30 $Bi_2O_3$, 1-10 CuO, 0-10 $Sb_2O_3$, 0-10 $V_2O_5$, 0-10 $MnO_2$, 0-10 FeO, where $CuO+Sb_2O_3+V_2O_5+MnO_2+FeO$ 2-20, 0-5 $SiO_2$, 0-5 $B_2O_3$, 0-5 $Al_2O_3$ and 0-5 $La_2O_3$. The sealing compositions may contain 58-95 wt % the glass and 5-42 wt % refractory fillers free from Pb and alkali metals.

V. Akishin et al. "Low melting lead free phosphate glasses for electronics", Latvijas Kimijas Zurnals (1997), (2), 101-106, reports low melting (Tg=360-420° C.) lead free glasses on Zn metaphosphate (mole %: $ZnO=P_2O_5$ 36-44; $SiO_2$ 8-12 $V_2O_5$ 0-10; $Al_2O_3$ 2-8).

J. Chiba in Japanese patent JP09188544 issued Jul. 22, 1997 (application No. JP 1996-2581) "Lead free weather resistant low melting zinc phosphate based sealing glass compositions", teaches glass compositions comprising (wt %): ZnO 15-55, $P_2O_5$ 30-75, $Li_2O+Na_2O+K_2O$ 0-2.8, $Al_2O_3$ 0.1-5, $SnO_2+TiO_2+ZrO_2$ 0.1-2, $Bi_2O_3$ 0-30, $SiO_2$ 0-5, $B_2O_3$ 0-10, $V_2O_5+Ti_2O_3$ 0-5 and F 0-2 wt %.

B. G. Aitken U.S. Pat. No. 5,286,683 teaches low transition temperature glass <375° C. which is resistant to boiling water. His most preferred glass composition comprises, $Li_2O$ 7.0, $Na_2O$ 8.0, $K_2O$ 5.0, CuO 15.0, ZnO 0.9, $ZnF_2$ 14.1, $CaF_2$ 7.5, $BaF_2$ 7.5, $Al_2O_3$ 2.0, $P_2O_5$ 33.0 mole %. This composition contains high concentration of alkali metals oxides (20 mole %), high concentration of fluorides and low concentration of ZnO and $P_2O_5$.

DETAILED DESCRIPTION OF THE INVENTION

In the discussion which follows, all compositional percentages are mole %, unless otherwise stated, and whenever compositional ranges are indicated, they should be understood as including the lower and upper limits.

The invention provides a glass composition comprising, in mole percent of the total composition: Glass-forming compounds in a total amount of 40.1-75%, wherein said glass forming compounds comprise 40-65% $P_2O_5$, 0.1-15% $Nb_2O_5$, 0-6% $Al_2O_3$, 0-10% $Bi_2O_3$ and 0-5% $B_2O_3$, and glass modifiers in a total amount of 25-59.9%, wherein said glass modifiers comprise 25-37% ZnO and 0-3% $Na_2O$.

It has been found by the inventor that the amount of $P_2O_5$ in the glass should be at least 50 mole % of the total composition in order to render the viscosity of the glass suitable for sealant applications and to provide the appropriate range for the formation of blue color. It has also been found by the inventor that the amount of $P_2O_5$ must not exceed the limit of 65 mole %, since higher amounts might lead to unsatisfactory durability.

The range of amounts of the $Nb_2O_5$ according to the present invention is between 0.1-15 mole % of the total composition. Within that range, the viscosity and durability of some compositions are suitable for applications as sealant and thick film formulations. In this composition range an intense blue color is developed. Preferably, the amount of $Nb_2O_5$ is between 0.1-12.5 mole %, more preferably 1-10 mole %.

The range of the amounts of the $Al_2O_3$ according to the present invention, is between 0-6 mole % of the glass composition. Within that range, the $Al_2O_3$ has beneficial effect on the durability, glass-forming ability and thermal expansion of the glass. Preferably, the amount of $Al_2O_3$ will be between 0.1-5 mole %, most preferably around 2 mole %. The range of the amount of the $Bi_2O_3$ according to the present invention is between 0-10 mole % of the total composition inclusive. Within that range, the viscosity and durability of the glass are suitable for applications as sealant and in thick film formulations. Preferably, the amount of $Bi_2O_3$ is between 0.1-5 mole %.

According to a preferred embodiment of the present invention, the glass composition may optionally comprise glass-forming compounds in addition to $P_2O_5$, $Nb2O_5$, $Al_2O_3$ and $Bi_2O_3$, wherein the total amount of said $P_2O_5$, $Nb_2O_5$, $Al_2O_3$ and $Bi_2O_3$ and said optional glass forming compounds being between 40.1-75 mole % of total composition. Suitable glass forming compounds as defined above, in addition to $P_2O_5$, $Nb_2O_5$, $Al_2O_3$ and $Bi_2O_3$ may be selected, for example, from the group consisting of $B_2O_3$, $Ta_2O_5$, $V_2O_5$, $Sb_2O_3$, $ZrO_2$ and $TiO_2$ or mixtures thereof.

In another preferred embodiment, the present invention provides a glass compositions comprising, in mole % of the total composition: glass-forming compounds in total amount of 40.1 to 75 mole %, wherein said glass forming compounds comprise 40-65 mole % $P_2O_5$, 0.1-10 mole % $Nb_2O_5$, 0.1-6 mole % $Al_2O_3$ and 0.1-10 mole % $Bi_2O_3$, and the glass modifiers in total amount of 25 to 59.9 mole %, wherein said glass modifiers comprise 25-37 mole % ZnO and 0-3 mole % $Na_2O$.

ZnO and $Na_2O$ are considered in the art as glass modifiers. The glass composition according to the present invention may include additional glass modifiers which may be selected, for example, from the group consisting of MgO, CaO, SrO, BaO, oxides and/or fluorides of alkali metals and oxides of transition metals such as CuO, MnO and $Fe_2O_3$, or mixtures thereof.

The above mentioned glass ingredients alter the properties of the glass composition in various aspects as will now be illustrated.

Preparation of the Glass:

The preparation of the glasses of the present invention can be carried out by conventional methods which are well known in the art. For example, one such method consists of mixing together the desired proportions of oxide or fluoride precursors, melting the mixture and pouring the molten composition into water to form a frit. An oxide or fluoride precursor may, of course, be any compound that will yield the desired oxide or fluoride under the usual conditions of frit production. For example, boric oxide will be obtained from boric acid; $P_2O_5$ will be obtained from phosphoric acid, $NH_4H_2PO_4$ or from phosphates of zinc, sodium, aluminum and boron; barium oxide will be produced from barium carbonate; etc. The glass is preferably milled in a ball mill with water to reduce the particle size. As is well known in the art, melting is conducted at a peak temperature and for a time such that the melt becomes entirely liquid and homogeneous. In preparing the glasses of the present invention, the components are premixed by shaking in polyethylene jar with plastic balls, and are then melted in a platinum or a high purity alumina crucible at the desired temperature. The melt is maintained at a peak temperature of 900-1300° C. for a period of 10-30 minutes. The melt is then poured into cold water. The maximum temperature of the water during quenching is kept as low as possible by increasing the volume of water to melt ratio. The crude frit after separation from water is freed from residual water by drying in air or by displacing the water by rinsing with methanol. The crude frit is then ball milled for 3-5 hours in alumina containers using alumina balls. Alumina picked up by the materials, if any, is not within the observable limit as measured by X-ray diffraction analysis. After discharging the milled slurry from the frit, the powder is air-dried. The dried powder is then screened through a 325 mesh screen to remove any large particles.

Another aspect according to the present invention is related to thick film formulations comprising finely divided particles of the glass according to the present invention dispersed, optionally together with additional solids selected according to the intended use of the formulation, in an organic medium, conductive metal particles, the total composition of the solids dispersed in the organic medium being between 0.5 to 80 weight % glass particles and between 20 to 99.5 weight % conductive metal or conducting metallic oxide.

In another preferred embodiment of the present invention, the thick film formulation comprises additional solids which are ceramic fillers, the weight of said ceramic fillers being not higher than 20% of the total weight of solids dispersed in the organic medium. The ceramic fillers are, for example, selected from among vitreous silica, zircon and mixtures thereof.

Any inert liquid, such as various organic liquids, with or without thickening and/or stabilizing agents and/or other common additives, may be used as the medium. Suitable organic liquids are aliphatic alcohols or esters thereof, terpens such as pine oil, terpineol and the like, solutions of resins such as the polymethylacrylates of lower alcohols and solutions of ethyl cellulose in solvents such as pine oil and the monobutyl ether of ethylene glycol monoacetate. Preferred organic mediums are ethyl cellulose solution in terpineol and butyl ethers of ethylene glycol.

Prepartation of Thick Film Formulations:

The preparation of thick film formulations according to the present invention can be carried out by conventional methods which are well known in the art. In the preparation of the formulations of the present invention the particulate inorganic solids are mixed with the organic medium and dispersed with suitable equipment, such as a Muller, to form a suspension, resulting in a composition for which the viscosity will be in the range of about 100-150 pascalseconds at a shear rate of 4 $\sec^{-1}$.

The thick film formulation according to present invention was prepared in the following manner: The organic mediums used consisted of a mixture of diethylene glycol dibutyl ether, terpineol, and ethyl cellulose. The ingredients of the formulation, except for about 5 weight percent of the organic components, are weighed together in a container. The components are then vigorously mixed to form a uniform blend; then the blend is passed through dispersing equipment, such as a Muller, to achieve a good dispersion of particles. A Hegman gauge is used to determine the state of dispersion of the particles in the paste. This instrument consists of a channel in a block of steel that is 25 µm deep (1 mil) on one end and ramps up to 0" depth at the other end. A blade used to draw down paste along the length the length of the channel. Scratches will appear in the channel where the agglomerates' diameter is greater than the channel depth. A satisfactory dispersion will give fourth scratch point of 10-18 µm, typically. A fourth scratch measurement of >10 µm indicates a poorly dispersed suspension. The remaining 5% consisting of organic components of the paste is then added, and the resin content is adjusted to bring the viscosity, when fully formulated, to between 140 to 200 Pa. sec at a shear rate of 4 $\sec^{-1}$. the composition is then applied to a substrate, such as alumina ceramic, usually by the process of screen printing, to a wet thickness of about 30-80 microns, preferably 35-70 microns, and most preferably, 40-50 microns. The compositions of this invention can be printed onto the substrates either by using an automatic printer or a hand printer in the conventional manner, preferably employing automatic screen stencil techniques, using a 200 to 325 mesh screen. The printed pattern is then dried at below 200° C., about 150° C., for 5-15 minutes before firing. Firing to effect sintering of both the inorganic binder and the finely divide particles of metal is preferably done in a well ventilated belt conveyor furnace with a temperature profile that will allow burnout of the organic matter at about 300° C.-650° C., lasting about 5-15 minutes, followed by a controlled cool-down cycle to prevent oversintering, unwanted chemical reactions at intermediate temperatures, or substrate fracture, which can occur from a too-rapid cool-down. The overall firing procedure will preferably extend over a period of about 1 hour, with 20-25 minutes to reach the firing temperature, about 10 minutes at the firing temperature, and about 20-25 minutes to cool down. In some instances, total cycle times as short as 30 minutes can be used.

The following examples are given for the purpose of illustration, and are not intended to limit the scope of the invention.

EXAMPLES

Examples 1-11

The compositions of 11 glasses (in mole %) and some physical properties of interest: glass transition temperature (Tg), dilatometer softening temperature (Td) and linear coefficient of expansion in the temperature range of 100 to 300° C. (except some glasses with low Tg such as examples No. 1,5 and 9 in table 1) are detailed in table 1. The source of $P_2O_5$ was $H_3PO_4$ for examples 1 to 11 and the melting was done in platinum crucible. Table 1 shows that a simple zinc phosphate glass (example No. 1) has very low Td and high coefficient of expansion. This glass is very hygroscopic, it absorbs water from the atmosphere and dissolves. This glass has very poor durability. Example 2 to 8 illustrate stable glasses with good durability (when $B_2O_3$ concentration is $\geq$10 mole %) and small expansion. However, these glasses have high Tg and even with partial substitution of fluorides for ZnO (examples 6 to 8) there is slight decrease in Tg but these glasses crystallize easily. Examples 9 to 11 illustrate the effect of $Nb_2O_5$: low Tg and Td and durability comparable to the zinc borophosphate glasses. All the $Nb_2O_5$ containing glasses have blue color.

TABLE 1 glass composition in mole %
examples No. 1

| | 1* | 2* | 3* | 4* | 5* | 6* | 7* | 8* | 9 | 10 | 11 |
|---|---|---|---|---|---|---|---|---|---|---|---|
| ZnO | 30 | 30 | 30 | 30 | 30 | 25 | 20 | 25 | 30 | 30 | 30 |
| $P_2O_5$ | 70 | 50 | 60 | 65 | 67.5 | 50 | 50 | 50 | 65 | 62.5 | 60 |
| $B_2O_3$ | — | 20 | 10 | 5 | 2.5 | 20 | 20 | 20 | — | — | — |
| $Nb_2O_5$ | — | — | — | — | — | — | — | — | 5 | 7.5 | 10 |
| $Bi_2O_3$ | — | — | — | — | — | — | — | — | — | — | — |
| $Na_2O$ | — | — | — | — | — | — | — | — | — | — | — |
| $Al_2O_3$ | — | — | — | — | — | — | — | — | — | — | — |
| $ZnF_2$ | — | — | — | — | — | 5 | 10 | — | — | — | — |
| LiF | — | — | — | — | — | — | — | 5 | — | — | — |
| Tg (° C.) | — | 593 | 428 | 345 | 281 | 531 | 544 | 515 | 283 | 381 | 491 |
| Td (° C.) | 148 | 642 | 482 | 410 | 332 | 618 | 603 | 570 | 348 | 432 | 539 |
| $\alpha_{100-300°C.} \times 10^7 °C^{-1}$ | 141.1** | 71.1 | 91.5 | 91.0 | 106.4+ | 62.3 | 76.3 | 85.4 | 95.2++ | 79.7 | 64.1 |

*comparative example
**α from 25° C. to 140° C.
+α from 25° C. to 240° C.
++α from 25° C. to 260° C.

Examples 12-19

Examples 12 to 19 are modifications of the zinc niobium phosphate of table 1. Most of these glasses (examples 12 to 18) were prepared in $Al_2O_3$ crucible an the source of $P_2O_5$ was $NH_4 H_2 PO_4$. Melting in $Al_2O_3$ crucible increases the $Al_2O_3$ content of the glass and modifies the physical properties. The compositions of table 2 were calculated from batch. Example 19 was melted in platinum crucible and the source of $P_2O_5$ was $H_3 PO_4$. Example 12 is the same composition as example NO. 9 of table 1, comparison shows that melting in $Al_2O_3$ crucible (example No.12) increases the Tg and Td and lowers the expansion coefficient. Example 13 (the same composition as example No. 10 of table 1) shows that the viscosity increases due to the melting in $Al_2O_3$ crucible and even at 1250° C. the glass is very viscous to pour. Similar behavior is shown by the $Ta_2O_5$ containing glass (example No. 14). Comparison of examples 12 and 14 shows that $Ta_2O_5$ raises the Tg and Td and hence the viscosity compared to $Nb_2O_5$. Example No. 14 had blue color like the niobium containing glasses.

Examples 15 to 18 show the beneficial effects of $Bi_2O_3$, $Al_2O_3$ and $Na_2O$: low Tg and Td and fairly small linear coefficient of expansion.

Example No. 19 shows that by proper selection of the ingredients and melting in platinum crucible very good properties are possible.

All the glasses of table 2 have very good durability.

| | 12 | 13 | 14 | 15 | 16 | 17 | 18 | 19 |
|---|---|---|---|---|---|---|---|---|
| ZnO | 30 | 30 | 30 | 32 | 35 | 32 | 32 | 32 |
| $P_2O_5$ | 65 | 62.5 | 65 | 55 | 55 | 56.99 | 55 | 62 |
| $Nb_2O_5$ | 5 | 7.5 | — | 5 | 0.01 | 0.01 | 5 | 3 |
| $Al_2O_3$ | — | — | — | — | 4.99 | 5 | — | 3 |
| $Na_2O$ | — | — | — | 3 | 3 | 3 | 3 | — |
| $Bi_2O_3$ | — | — | — | 5 | 5 | — | 5 | — |
| $Ta_2O_5$ | — | — | 5 | — | — | — | — | — |
| Crucible | $Al_2O_3$ | $Al_2O_3$ | $Al_2O_3$ | $Al_2O_3$ | $Al_2O_3$ | $Al_2O_3$ | $Al_2O_3$ | Pt |
| Tg (° C.) | 403 | * | ** | 386 | 406 | 451 | 357 | 360 |
| Td (° C.) | 464 | * | ** | 448 | 453 | 505 | 414 | 437 |
| $\alpha_{100-300°C.} \times 10^7 °C^{-1}$ | 84.6 | — | — | 79.5 | 94.5 | 76.2 | 85.7 | 85.6 |

*too viscous to pour at 1250° C.
**too viscous to pour at 1400° C.

The invention claimed is:

1. A glass composition consisting of, in terms of mole percent of the total composition,
   a. 40-65% $P_2O_5$;
   b. 0.1-15% $Nb_2O_5$;
   c. 25-37% of ZnO;
   d. 0-6% $Al_2O_3$;
   e. 0-10% $Bi_2O_3$;
   f. 0-5% $B_2O_3$
   g. total of 0-5% of $Ta_2O_5$, $V_2O_5$, $Sb_2O_3$, $ZrO_2$, and/or $TiO_2$;
   h. 0-3% alkali oxides;
   i. 0-5% alkali fluorides; and
   j. total of 0-5% oxides of Mg, Ca, Sr, Ba, Cu, Fe, and/or Mn.

2. A glass composition according to claim 1, comprising $Al_2O_3$.

3. A glass composition according to claim 1, comprising $Bi_2O_3$ and/or $B_2O_3$.

4. A glass composition according to claim 1, comprising 0.1-3% $Na_2O$.

5. A glass composition according to claim 1, including at least 50% $P_2O_5$.

6. A glass composition according to claim 1 comprising up to 10% $Nb_2O_5$.

7. A glass composition according to claim 1, having $T_g$ of between 200° C. and 500° C.

8. A glass composition according to claim 1 or 7, having an expansion coefficient of $12\times10^{-6}$ $K^{-1}$ or less.

9. A glass composition of claim 1 that is free of lead and cadmium, has a $T_g$ of between 200° C. and 500° C., and expansion coefficient of $12\times10^{-6}$ $K^{-1}$ or less, said glass comprising, by mol percent of the total composition, at least 3% $Nb_2O_5$ and/or $Al_2O_3$, 25-37% ZnO, and at least 40% $P_2O_5$.

10. A glass composition according to claim 9, having an expansion coefficient of $10\times10^{-6}$ $K^{-1}$ or less.

11. A glass composition according to claim 9, comprising 3-10% $Nb_2O_5$.

12. A glass composition according to claim 9, comprising 3-6% $Al_2O_3$.

13. A glass composition according to claim 9, which is further free of nickel, chromium, and arsenic.

14. A glass composition according to claim 9, comprising no more than a total of 3% of alkali oxide, alkali fluoride, and mixtures thereof.

15. A thick film formulation comprising particles of glass according to claim 1 or 9, dispersed in an organic medium.

16. A thick film formulation according to claim 15, further comprising solid particles other than said particles of glass.

17. A thick film formulation according to claim 16, wherein said solid particles are conducting particles and/or ceramic fillers.

18. A thick film formulation according to claim 16, wherein the solid particles include 0.5-80% (w/w) of glass particles.

19. A thick film formulation according to claim 18, comprising up to 20% of ceramic fillers.

20. An article comprising a thick film formulation according to claim 15 fired on a ceramic substrate.

21. A glass composition consisting of, in terms of mole percent of the total composition,
 a. 40-65% $P_2O_5$;
 b. 0.1-15% $Nb_2O_5$;
 c. 25-37% of ZnO;
 d. 0-6% $Al_2O_3$;
 e. $Bi_2O_3$ in an amount greater than 0 up to 10%;
 f. 0-5% $B_2O_3$
 g. total of 0-5% of $Ta_2O_5$, $V_2O_5$, $Sb_2O_3$, $ZrO_2$, and/or $TiO_2$;
 h. 0-3% alkali oxides;
 i. 0-5% alkali fluorides; and
 j. total of 0-5% oxides of Mg, Ca, Sr, Ba, Cu, Fe, and/or Mn.

22. A glass composition consisting of, in terms of mole percent of the total composition,
 a. 40-65% $P_2O_5$;
 b. 0.1-15% $Nb_2O_5$;
 c. 25-37% of ZnO;
 d. 0-6% $Al_2O_3$;
 e. 0-10% $Bi_2O_3$;
 f. 0-5% $B_2O_3$
 g. greater than 0 of $V_2O_5$ and/or $Ta_2O_5$, and optionally one or more of $Sb_2O_3$, $SRO_2$ and $TiO_2$, in a total amount of up to 5%;
 h. 0-3% alkali oxides;
 i. 0-5% alkali fluorides; and
 total of 0-5% oxides of Mg, Ca, Sr, Ba, Cu, Fe, and/or Mn.

23. A glass composition consisting of, in terms of mole percent of the total composition,
 a. 40-65% $P_2O_5$;
 b. 0.1-15% $Nb_2O_5$;
 c. 25-37% of ZnO;
 d. 0-6% $Al_2O_3$;
 e. 0-10% $Bi_2O_3$;
 f. 0-5% $B_2O_3$
 g. greater than 0 of $Ta_2O_5$, and optionally at least one of $V_2O_5$, $Sb_2O_3$, $ZrO_2$ and $TiO_2$ in a total amount of up to 5%;
 h. 0-3% alkali oxides;
 i. 0-5% alkali fluorides; and
 j. total of 0-5% oxides of Mg, Ca, Sr, Ba, Cu, Fe, and/or Mn.

* * * * *